United States Patent [19]

Campbell

[11] Patent Number: 4,592,146
[45] Date of Patent: Jun. 3, 1986

[54] TOOL PRE-GAUGING DEVICE

[75] Inventor: Michael E. Campbell, Farmington Hills, Mich.

[73] Assignee: General Electric Company, Pittsfield, Mass.

[21] Appl. No.: 658,490

[22] Filed: Oct. 9, 1984

Related U.S. Application Data

[63] Continuation-in-part of Ser. No. 591,356, Mar. 20, 1984.

[51] Int. Cl.[4] .............................................. B27G 23/00
[52] U.S. Cl. .................................... 33/185 R; 33/551; 33/556; 33/1 M
[58] Field of Search .......... 33/185 R, 180 R, 179.5 R, 33/174 L, 174 Q, 179.5 E, 1 M, 550, 551, 556

[56] References Cited

U.S. PATENT DOCUMENTS

| | | | |
|---|---|---|---|
| 3,259,989 | 7/1966 | Wilson | 33/174 L |
| 3,518,769 | 7/1970 | Bullard, III et al. | 33/185 R |
| 3,701,199 | 10/1972 | Lewis | 33/185 R |
| 3,840,994 | 10/1974 | Izumi et al. | 33/174 L |
| 4,151,642 | 5/1979 | Holland et al. | 33/185 R |
| 4,442,607 | 4/1984 | Sakata et al. | 33/1 M |
| 4,477,978 | 10/1984 | Azuma | 33/1 M |

Primary Examiner—Willis Little
Attorney, Agent, or Firm—Hedman, Gibson, Costigan & Hoare

[57] ABSTRACT

A device and method for automatically pregauging cutting tools comprising means for releasable holding a cutting tool in a gauging position, and an electronic gauging means movable to contact the cutting tool in the gauging position for measuring the offsets between a master cutting tool and other cutting tools of the same type.

6 Claims, 11 Drawing Figures

TOOL PRE-GAUGING DEVICE

This application is a continuation-in-part of U.S. patent application Ser. No. 591,356 filed on Mar. 20, 1984.

BACKGROUND OF THE INVENTION

1. Field of Invention

This invention relates to an apparatus for and a method of pre-gauging cutting tools. More particularly, the invention measures the offsets remotely from the work station for storage and maintenance in a machine tool control memory system for future use or for connection to a network computer having communication to large numbers of machine tools.

2. Description of the Prior Art

Replacement of worn cutting tools at a CNC lathe or turning centers can be the cause of extensive down time thereby delaying completion of the work project. When a worn cutting tool is replaced, the tool must be gauged to determine its offset from a master tool of that same type in order to permit the lathe to continue making the proper cuts. In order to operate gauging devices that are located on the lathe a trial cut must be taken, the tool offsets measured and the adjustments made at the CNC controller. This is a time consuming procedure that unnecessarily increases production costs.

Thus, there is a need for a system to measure and store the offsets, and particularly an automated system which automatically measures and stores the offsets in the controller memory.

SUMMARY OF THE INVENTION

In accordance with the invention there is provided a device for pre-gauging cutting tools in advance of their use at the work station. A cutting tool is held in a clamping block similar to that used at the work station and an electronic gauging device is advanced and contacts the cutting tool measuring the offsets from the master tool of the same type. The offsets are automatically stored in the CNC controller memory for future by use at the work station.

A system using a bar code reader and bar code label is included to automatically identify and properly store the offsets in the memory.

Thus, the system of the invention quickly and easily pre-gauges the cutting tools without downtime at the machine tool, therefore reducing the scraping of machine parts.

BRIEF DESCRIPTION OF THE DRAWINGS

The following is a detailed description together with accompanying drawings of an illustrative embodiment of the invention. It is to be understood that the invention is capable of modification and variation apparent to those skilled in the art within the spirit and scope of the invention.

DESCRIPTION OF THE INVENTION

Referring to the drawings there is provided an illustrative embodiment of the device 10 including a two axis electronic measuring device 12 for pre-gauging cuttings tools 14 held in a tool clamping block 16. Preferably the tool clamping block 16 is similar to the one used at the machine work station.

Figure 5:
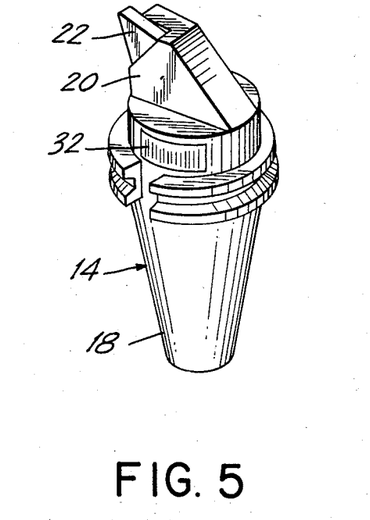
FIG. 5 is a schematic drawing of a cutting tool.

The device 10 of the invention can be used to pre-gauge a wide variety of standard and special cutting tools. As shown in FIG. 5 the cutting tool 14 includes a tapered shank 18 held by the block 16 and a head 20 which extends from the block 14 and holds the cutting insert 22. Normally these components of the cutting tool 14 are manufactured within certain tolerances. Accordingly, tools of the same type generally have slightly different dimensions. Typically, the same cutting tools can differ from one another by about 0.010 to about 0.020 inches. These differences result in offsets which are pre-gauged by the present invention.

The electronic measuring device 12 of the invention preferably includes a transducer head 24 and a probe 26 having a contact tip 28. The transducer head 24 may be connected to a digital display (not shown) where the offsets will be displayed and can then be recorded and entered into a CNC lathe controller (not shown). Alternatively, the transducer head 24 may be directly connected to the controller memory (see FIG. 11), to be recalled whenever that particular tool is used at the work station.

A bar code reader 30 is provided for reading a bar code strip 32 (FIG. 5) on the cutting tool 14. The bar code strip 32 identifies each particular cutting tool. The bar code reader is connected to the CNC machine tool controller (see FIG. 11) which combines the cutting tool offsets with the corresponding identification number for future use at the work station. In the illustrative embodiment, the bar code reader is manufactured by Scope Inc. under the designation Scope Scan 8200.

In the illustrative embodiment the electronic gauging device 12 is a commercially available unit manufactured by MARPOSS under the designation CONTAR A81-A. The electronic gauging device 12 can be used for zero-setting of a master tool. Thereafter, cutting tools 14 of the same type are measured by the electronic gauging device 12 to determine their offsets from the master tool. To make the measurements, the clamping block 16 is secured in a fixed gauging position and the electronic gauging device 12 is mounted on a carriage mechanism 34 which is moved to contact the cutting tool 14 by an electric motor 36. In a preferred embodiment, the operation of the device 10 is automatically controlled by a programmable controller such as the GE series 6 PC or by a conventional CNC controller, or Allen-Bradley 2/30 PLC. In addition, the controller can include a manual mode wherein all the operations of the device are controlled by individual switches located on an operator panel (not shown).

More particularly, the clamping block 16 is secured to the base 40 of the device 10 by a support bracket 42.

Figure 7:
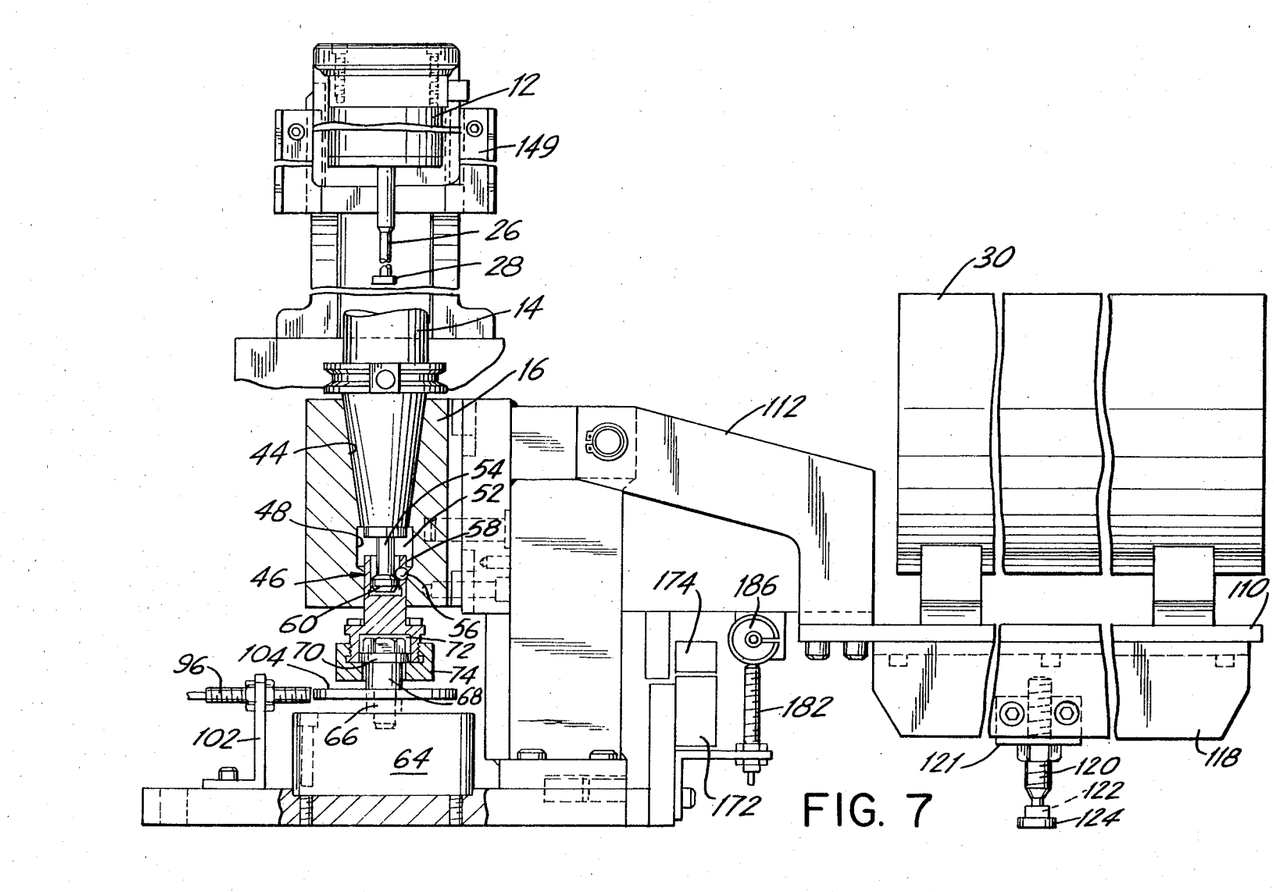
FIG. 7 is a right end elevational view of the device of FIG. 1.

The clamping block 16 includes a cavity 44 for receiving the tapered shank 18 of the cutting tool 14 and a ball detent mechanism 46 for locking the cutting tool 14 in the clamping block 16. The ball detent mechanism 46 is positioned in annular space 48 and includes a coupling 50 having a hollow cylindrical wall 52 for receiving a clamping post 54 of the cutting tool 14. A detent ball 56 resides within an aperture 58 in cylindrical wall 52 and engages knob 60 when the coupling 50 is in the lock position as shown in FIG. 7. When the coupling 50 is moved axially toward the cutting tool 14, the detent ball 56 drops in the space 48 allowing the knob 60 to be freely removed from the coupling 50. Correspondingly, when the coupling 50 is moved in the opposite direction the detent ball 56 engages the knob 60 to lock the cutting tool 14 in the block 16.

Figure 8:
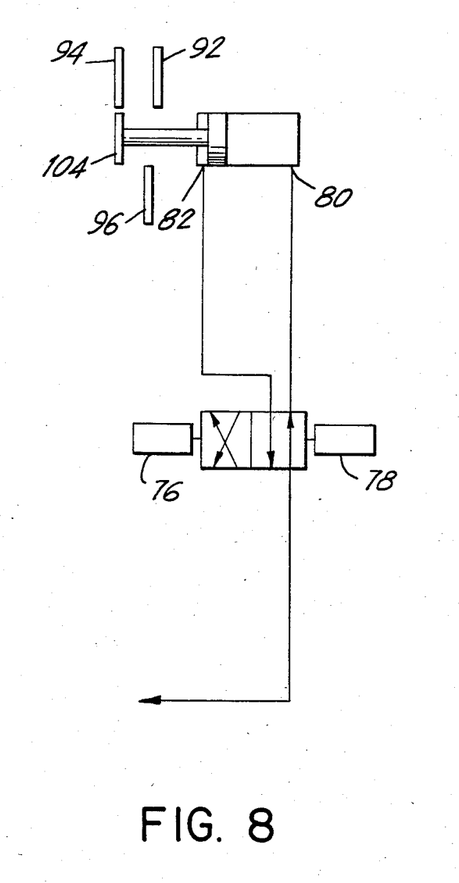
FIG. 8 is a drawing of the pneumatic circuit for clamping and unclamping the cutting tool.

In the illustrative embodiment, the coupling 50 is moved by a pneumatic cylinder and rod mechanism 62 including a cylinder 64 and rod 66 having an adapter 68 and button 70 attached to the end of rod 66 and which rests in chamber 72 of the coupling 50. A retainer 74 maintains the button 70 in the chamber 72. Solenoid valves 76 and 78 control the reciprocating movement of the rod 66. In the lock or clamp positions, as shown in FIG. 8, solenoid 78 is energized and solenoid 76 is de-energized so that air under pressure is delivered to port 80 of the cylinder 64 extending the rod 66 and moving the coupling 50 to the unlock position. Similarly, to lock the cutting tool 14 in the block 16, solenoid 78 is de-energized and solenoid 76 is energized delivering air through port 82 thereby retracting the rod 66 into the lock position. The solenoids 76 and 78 may be energized by switches on the operator panel or completely automatically by the controller (see FIG. 11).

Figure 4:
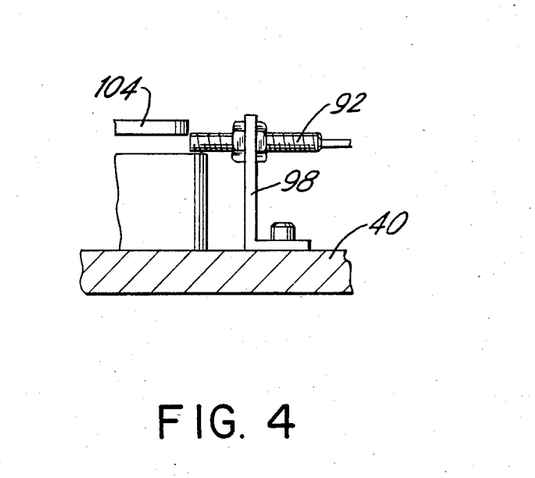
FIG. 4 is a cross sectional view of a cutting tool sensor take along line 4—4 of FIG. 1.

In a preferred embodiment, there is provided a sensing mechanism 90 to determine whether the cutting tool 14 is present in the block 16 and whether the tool is clamped or unclamped in the block 16. The sensing mechanism 90 comprises three sensors 92, 94 and 96 mounted in a spacial relationship to the base 40 via brackets 98, 100 and 102 respectively. See FIG. 4 showing sensor 92 by way of example. Each sensor is spaced a different amount from the base 40. In the preferred embodiment the sensors 92, 94 and 96 are proximity switches.

A sensor actuator 104 is connected to the rod 66 and moves to a first position A (FIG. 8) when the rod 66 is fully extended and to a second position B when the rod is retracted and the cutting tool 14 has been clamped. In addition, there is a third position C wherein the rod 66 and actuator 104 are fully retracted which will occur only if there is no cutting tool present in the block 16. Accordingly, the sensors 92, 94 and 96 are positioned at the three locations A, B and C where the actuator 104 will move to. Sensor 92 is aligned with the location of the actuator 104 when the rod 66 is fully retracted (no tool in the block 16) (FIG. 4). Sensor 94 is aligned with the location of the actuator 104 when the rod 66 is fully extended (tool unclamped). Sensor 96 is aligned with the location of the actuator 104 when the rod 66 has been retracted and a cutting tool 14 has been locked in the block 16. The proximity switches 92, 94 and 96 are electrically connected to the operating controller so that the condition of the clamping block 16 is known at all times.

The locking of the cutting tool 14 in the clamping block 16 will activate the controller to actuate the bar code reader 30 to read the bar code strip for identifying the cutting tool to be gauged. The reader 30 is mounted to a mounting plate 110 which is connected to the clamping block 16 by brackets 112 and 114 which are affixed to block support bracket 42. A swivel support mechanism 116 may be provided for adjusting the angle at which the bar code reader 30 projects the beam of light to the bar code label 32. For optimum results, the angle should be approximately 15° from the axis running perpendicular to the label. The swivel support mechanism 116 includes ribs 118 and 119 attached to the underside of the mounting plate 110. A pair of swivel screws 120 each having a head 122, are secured to a cross member 121 mounted between the rib 118 and the rib 119 with the head 122 extending into a pair of swivel feet 124 to support the bar code reader 30. The bar code reader 30 produces a beam of infrared light which is projected onto the bar code label 32 and bounces back to the reader 30 which reads and transmits the code to the controller thereby identifying the particular tool about to be pre-gauged.

Figure 6:
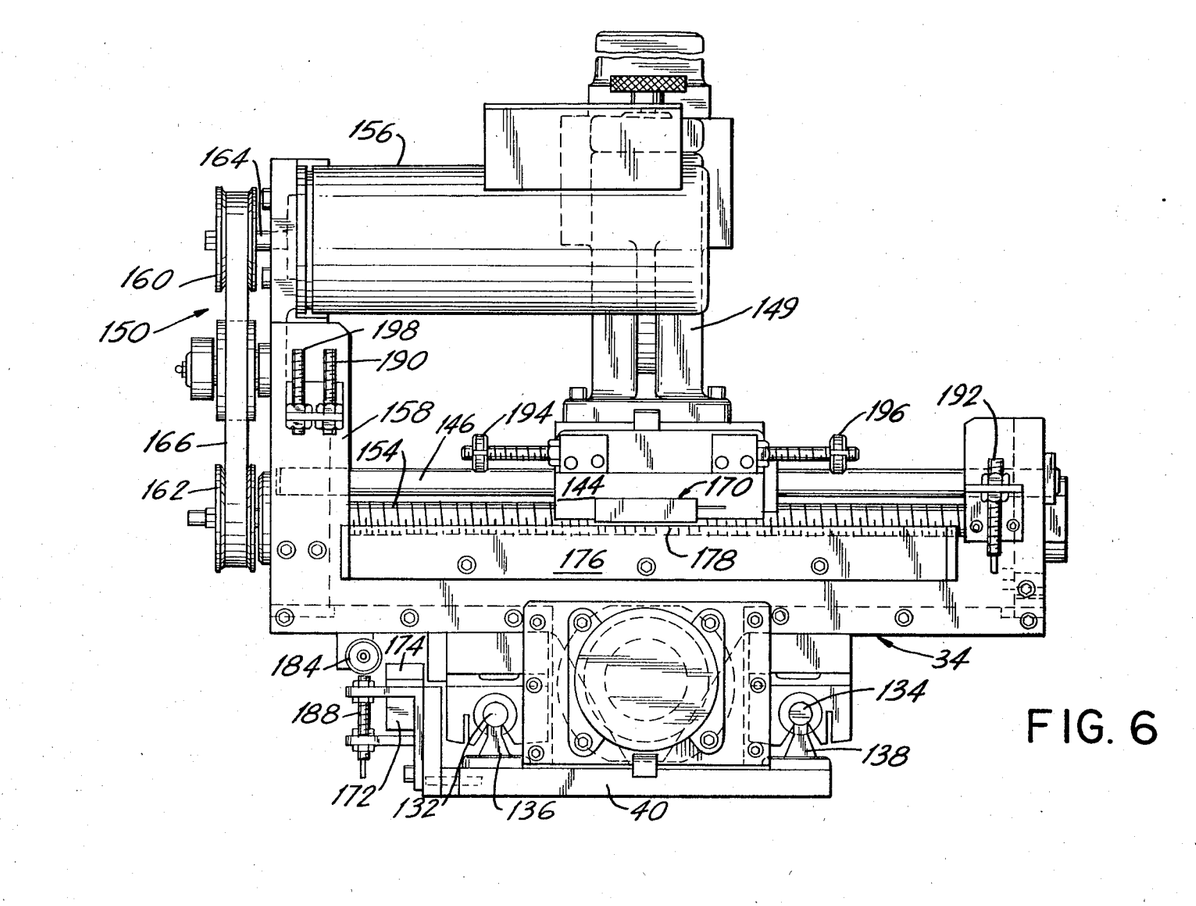
FIG. 6 is a left end elevational view of the device of FIG. 1.

In order to pre-gauge the cutting tool 14, the the electronic measuring device 12, carried by carriage mechanism 34, is moved into the gauging position. The carriage mechanism 34 includes a slidable platform 130 mounted on a first pair of spaced parallel rails 132 and 134 (FIG. 6). In turn, the rails 132 and 134 are mounted on the base 40 of the device by legs 136 and 138. The slidable platform 130 is advanced by drive means 140 (FIG. 2) which is electrically connected to the controller (FIG. 11) and includes a ball screw mechanism 142 driven by the DC servo motor 36. The DC motor 36 is directly connected to the ball screw mechanism 142 such that rotation of the motor 36 causes the ball screw mechanism 142 to rotate thereby advancing and retracting the platform 136 along the rails 132 and 134.

Mounted on top of the platform 130 is a slide 144 which is mounted on a second pair of spaced parallel rails 146 and 148 which extend along an axis perpendicular to that of the first rails 132 and 134.

Figure 2:
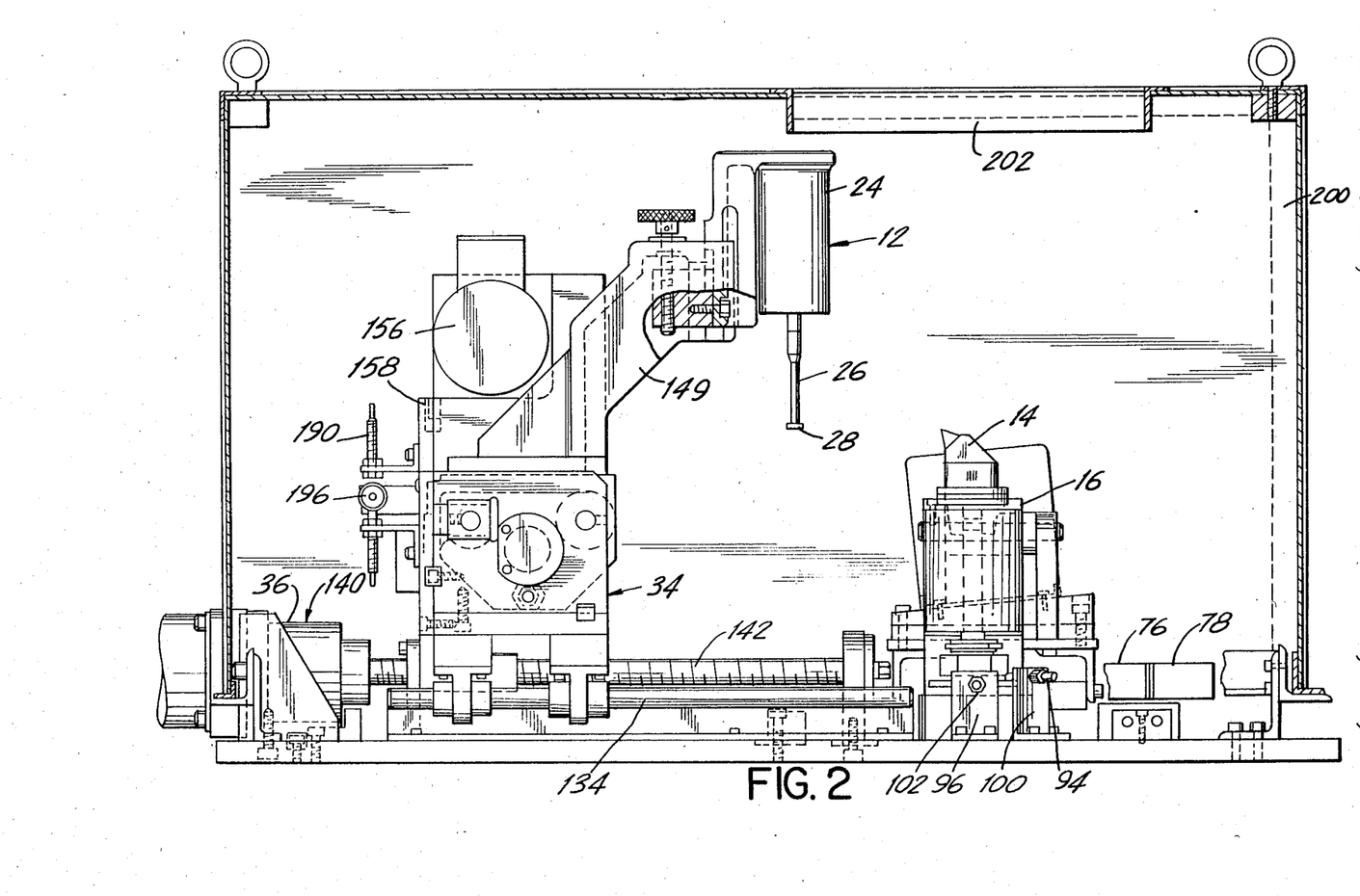
FIG. 2 is a side elevational view of the pre-gauging device of the invention.

The electronic measuring device 12 is mounted on the slide 144 by an angle bracket 149 such that the probe 26 will be positioned at the exact height of the cutting insert 122 when the cutting tool 14 is clamped in the clamping block 16 as shown in FIG. 2.

The slide 144 is moved along the rails 146 and 148 by a second drive means 150 also electrically connected to the controller (FIG. 11) and consisting of a ball screw mechanism 154 driven by a second servo motor 156. As shown in FIG. 6 the DC motor 156 is mounted above the slide on a bracket 158. Sprockets 160 and 162 are connected through a timing belt 166. Rotation of the axle 164 of the DC motor 156 causes the belt 166 to turn thereby turning the ball screw mechanism 154 to advance and retract the slide 144.

In the preferred embodiment, the pre-gauge device 10 measures the cutting tool offsets in two axes, the X and Z axes. The rails 132 and 134 extend along the X axis and the rails 146 and 148 extend along the Z axis. The drive means 140 will advance the electronic measuring device 12 from a fully retracted X axis home position to contact the cutting tool 14 in a gauging position for gauging the tool in the X direction. Correspondingly, the drive means 150 will advance the electronic measuring device 12 from a fully retracted Z axis home position to contact the cutting tool 14 in a gauging position for gauging the tool in the Z direction.

The movement of the electronic measuring device 12 via the drive means 140 and 150, as previously noted, can be controlled by a PC or CNC controller. Sensing mechanisms 168 and 170 are provided along the X and Z axes, respectively to determine the position of the slidable platform 130 and the slide 144 in order to permit the controller to automatically pre-gauge the cutting tool 14. In the illustrative embodiment, the sensing mechanisms 168 and 170 are Anilam Quantum scales manufactured by the Anilam Electronics Corporation and sold under the designation A-10. The sensing mechanism 168 consists of a scale 172 mounted to the base 40 of the device and a reader 174. The sensing mechanism 170 includes a scale 176 mounted on the platform 130 and a reader 178. The readers 174 and 178 are slidably attached to the scales 172 and 176 wherein movement of the readers along the scales can be electronically measured. The reader 174 is in engagement with platform 130 and will therefore travel along the scale 176 as the platform 130 moves, thereby measuring the linear position of the platform 130. Similarly, the reader 178 is in engagement with the slide 144 therefore measuring the linear position of the slide 144. The readers 174 and 178 are electrically connected to the PC controller operating the device 10 (FIG. 11) and when the pre-programmed readings are obtained, the controller automatically stops the movement of the electronic measuring device 12 so that the pre-gauging operation can be performed.

Figure 1:
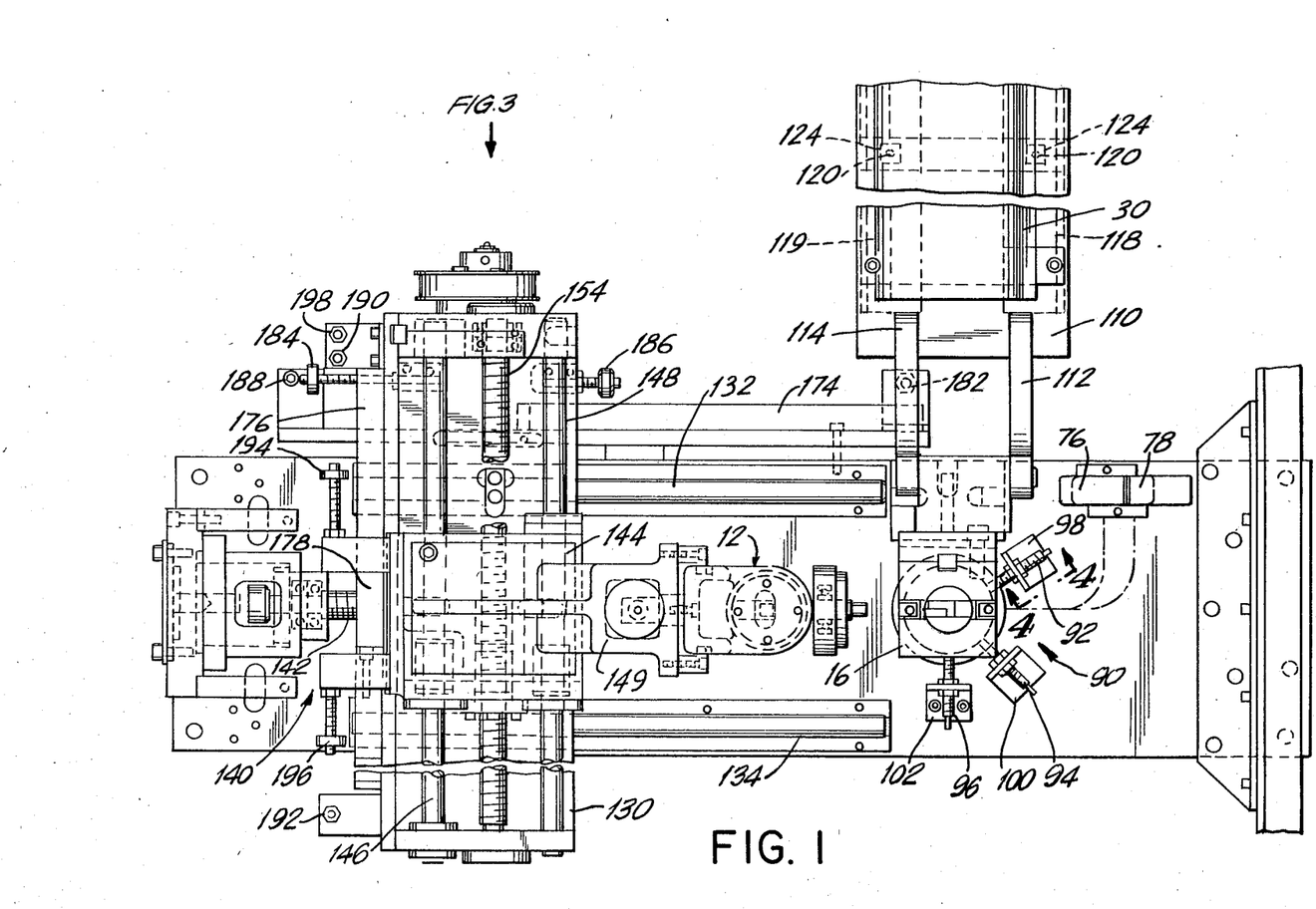
FIG. 1 is a plan view of the tool pre-gauging device of the invention.
Figure 3:
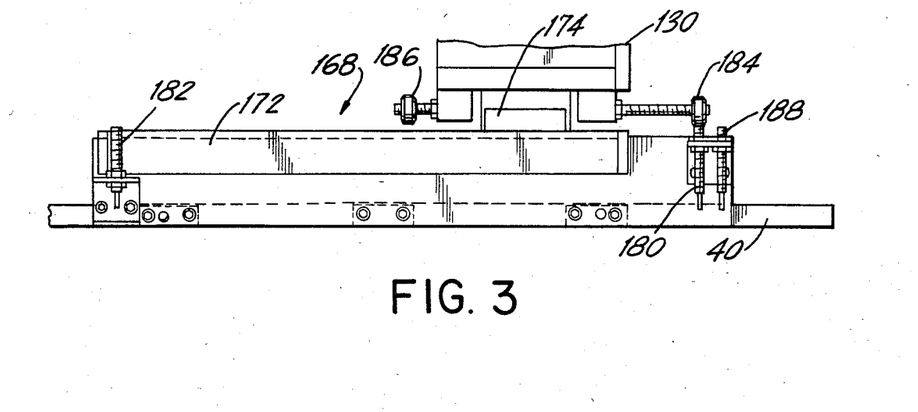
FIG. 3 is a detailed view showing the position sensing mechanism of the device.

Sensing means may be provided which consists of a series of proximity switches and sensors strategically placed throughout the device 10 for accurately returning the electronic measuring device 12 to the X and Z home positions. In addition, the sensing means may also be employed to indicate that the device 12 has advanced or retracted too far. As shown in FIG. 3, a proximity switch 180 is mounted to the base 40 at the home position to indicate that the platform 130 is fully retracted. A proximity switch 182 is mounted to the base 40 substantially adjacent the clamping block 16 (see FIG. 1) indicating that the platform 130 has been advanced beyond the gauging position. Sensing actuators 184 and 186 extend from opposite sides of platform 130 in the X axis. When the actuator 184 is adjacent the proximity switch 180 the controller will be signalled that the slide 130 is in the fully retracted position. Correspondingly, when the actuator 186 is adjacent the promixity switch 182 the controller will be signalled that the slide 130 has been advanced beyond the gauging position. Proximity switch 188 is provided adjacent switch 180 to indicate the platform 130 has been retracted too far as a safety measure.

Similarly, proximity switches 190 and 192 (FIGS. 1 and 6) are provided to indicate that the slide 144 is in the home or fully retracted position (switch 190) or that the slide 144 is in the overtravel position (switch 192). Switch 190 is mounted on the bracket 158 and the switch 192 is mounted on the platform 130. Actuators 194 and 196 are mounted on opposite sides of slide 144 along the Z axis for actuating the switches 190 and 192. In addition, proximity switch 198 is provided adjacent the home switch 190 as an end stop sensor.

Figure 9:
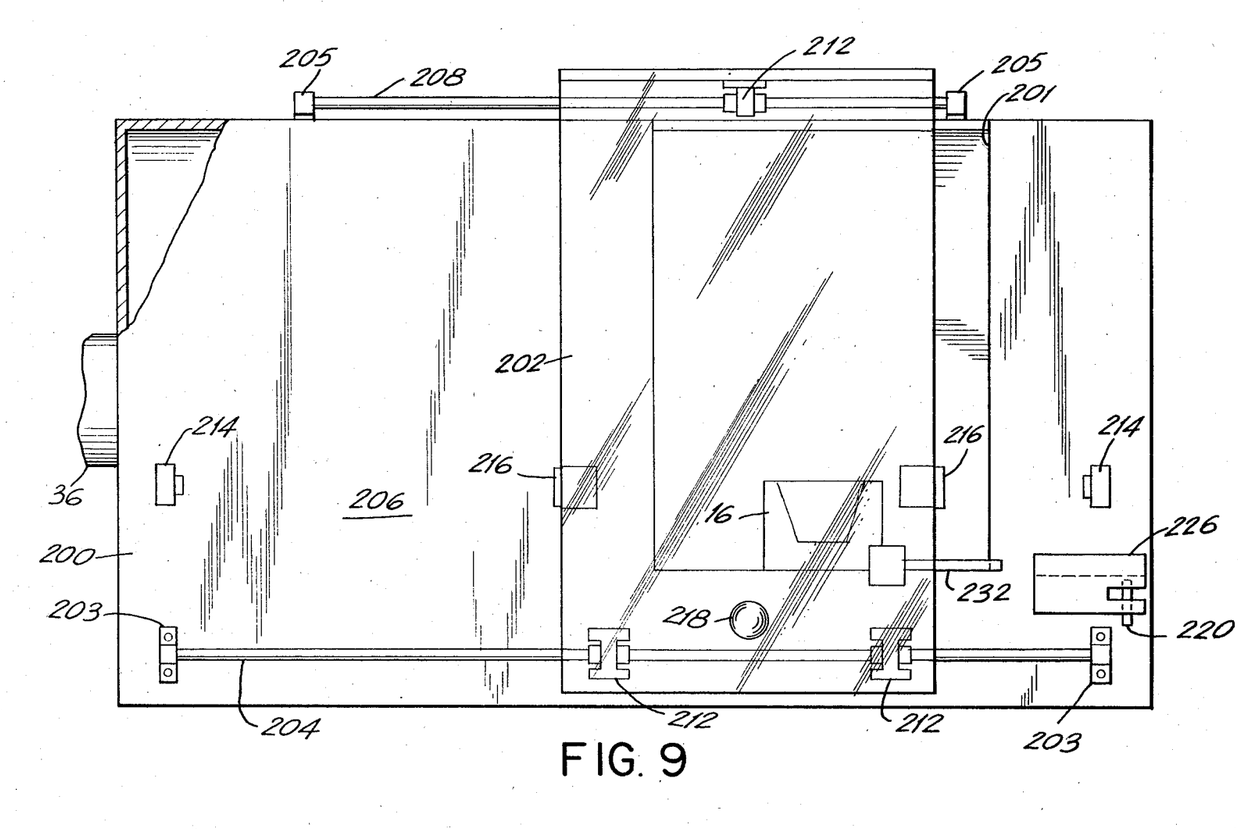
FIG. 9 is a top view of the enclosure of the device.
Figure 10:
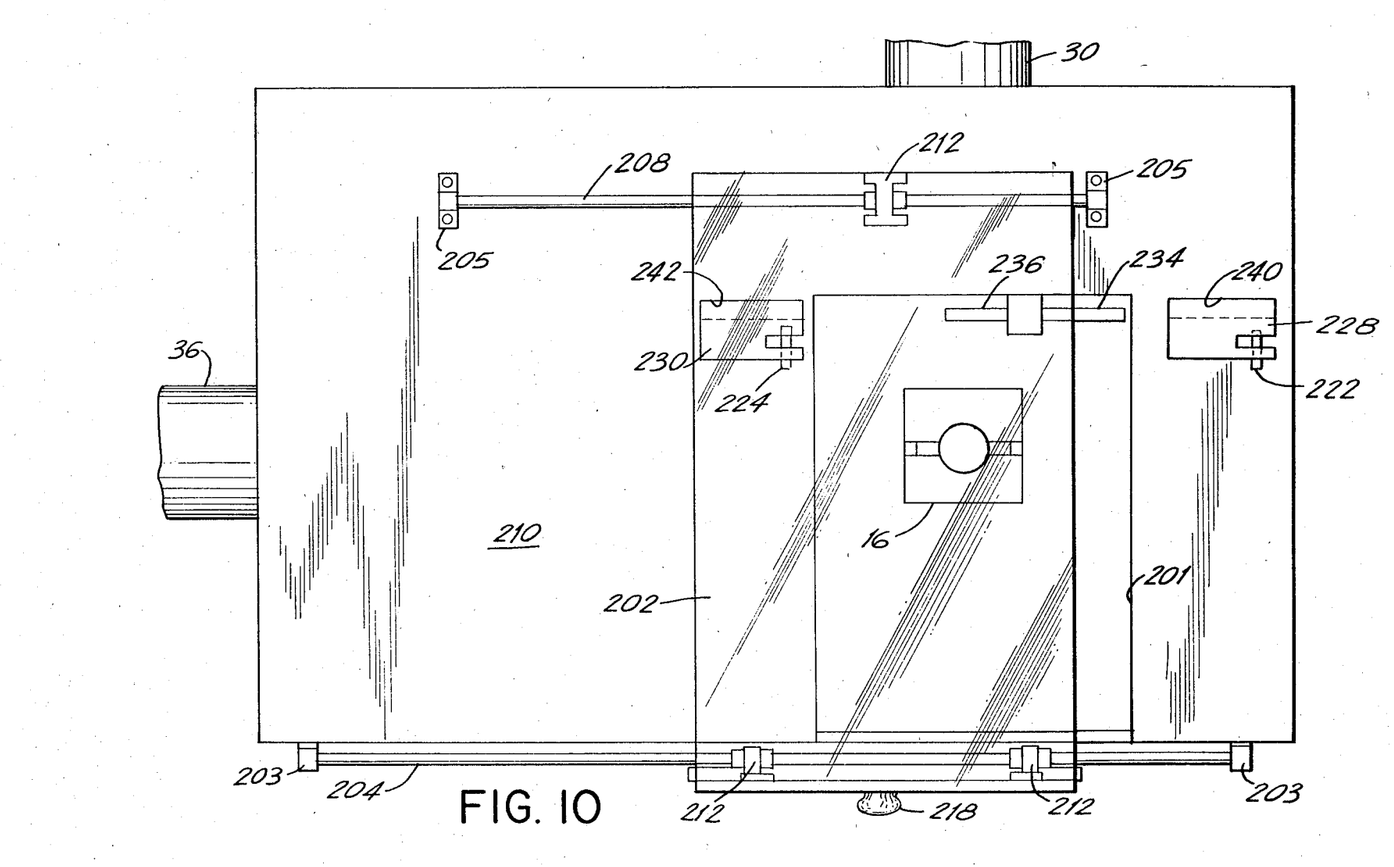
FIG. 10 is a side view of the enclosure of the device.

In a preferred embodiment, the device 10 is housed in a metal enclosure 200 with a clear sliding door 202. As shown in FIGS. 9 and 10, the enclosure 200 has open area 201 adjacent the tool holder block 16 to permit access to the block 16. The door 202 is slid alternatively over and away from the open area 201 to close and open the door 202. The door 202 slides on rail 204 mounted to the front side 206 of the enclosure 200 by brackets 203 and on rail 208 mounted on the top 210 of the enclosure 200 by brackets 205. Bushings 212 are mounted on the inner side of the door 202 through which the rails 204 slide. Stops 214 are provided on the front side 206 of the enclosure 200 for engaging stop brackets 216 mounted to the door 202. Handle 218 is provided for sliding the door 202 open and closed.

Switches may be provided connecting the door to the solenoids 76 and 78 at the PC controller whereby opening the door will extend the cylinder rod to unlock a tool in the clamp block 16 and closing the door will retract the rod 66 to lock the cutting tool 14 in the clamp block 16 for a fully automatic system. Proximity switches 220, 222 and 224 are located within sensor housings 226, 228 and 230 respectively which are secured to the enclosure 200. Indicator sensor bars 232, 234 and 236 are aligned with and are received within slots 238, 240 and 242 on the sensor housings 226, 228 and 230 respectively for actuating the proximity switches 220, 222 and 224. When the door 202 is closed switches 220 and 222 will be actuated and when the door 202 is open switch 224 will be actuated.

In operation the door 202 of the enclosure 200 is opened and a cutting tool 14 is inserted in the clamping block 16. When the door 202 is closed solenoid 76 is energized retracting the rod 66 to lock the cutting tool 14 in place. In this position the actuator 104 will be aligned with sensor 96 indicating to the controller that the cutting tool 14 has been clamped. Thereafter the bar code reader 30 is energized reading the bar code strip 32 on the cutting tool 14 and registering the tool identification number in the CNC controller. At this point both the platform 130 and the slide 144 are in their home, fully retracted positions in the respective X and Z axes. The respective drive means 140 and 150 are then energized to advance the electronic measuring device 12 into positon so that the probe 26 will contact the cutting insert 22 in order to measure the offsets in the X and Z directions. The offsets are the differences between the measurements of the cutting tool 14 and a measurements of a master tool of the same type as cutting tool 14 that have already been programmed into the controller. The controller has been programmed to start and stop the drive means 140 and 150 when the respective platform 130 and slide 144 have travelled the distance required as measured by the Anilam scale to bring the probe 26 in contact with the cutting insert 22.

Figure 11:
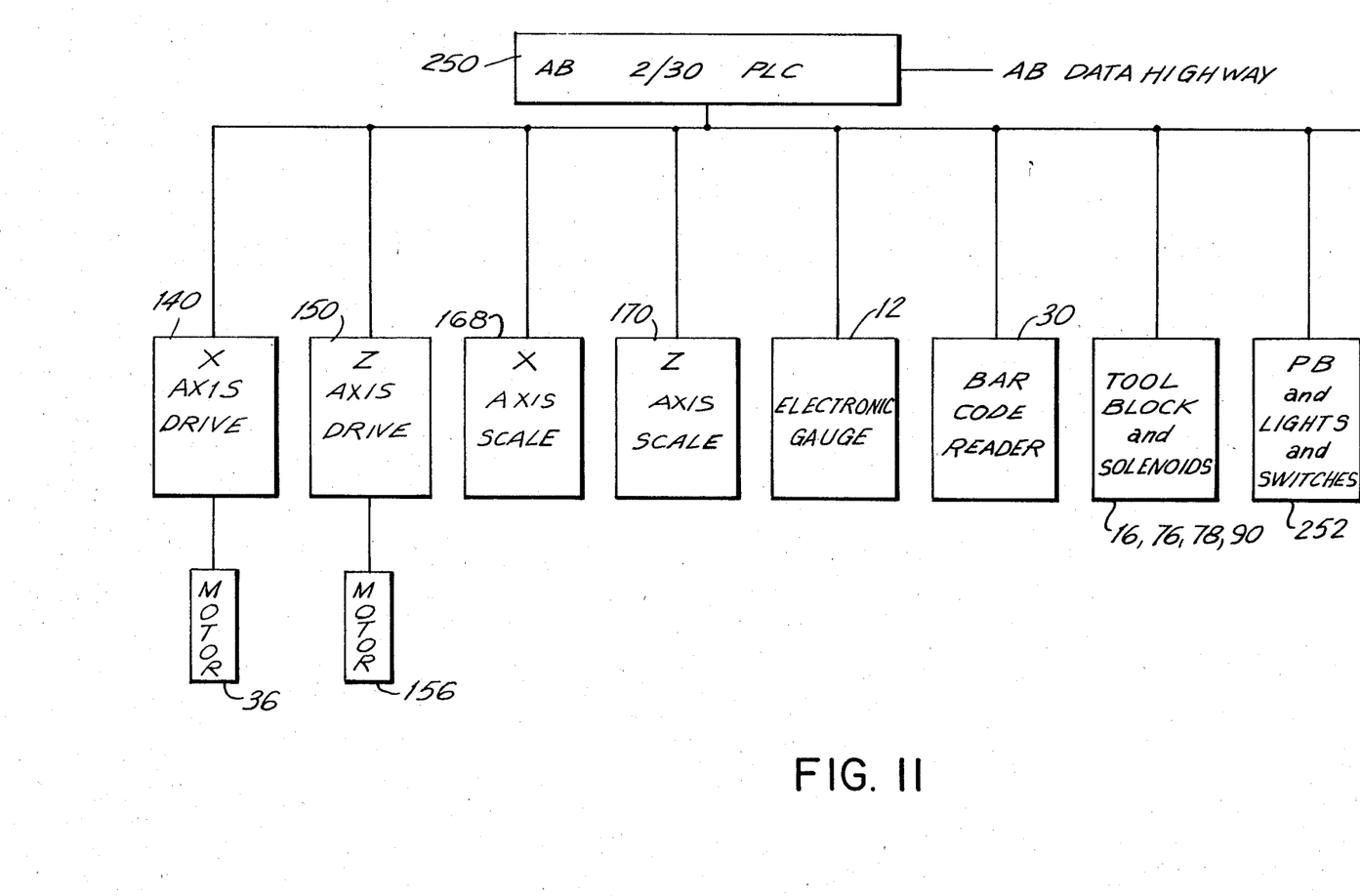
FIG. 11 is an electrical schematic showing the relationship of the elements of the device to the controller.

FIG. 11 is a block schematic diagram showing the electrical connection of the device 10 to the controller 250. The operator panel 252 includes push-buttons and switches for manual operation and indicator lights showing what stage of operation the device 10 is in. Once the offsets have been measured, they are stored in the memory of the controller 250. In addition, the device 10 is uniquely designed so that the offsets may be transferred to a data highway connected to numerous machine tools throughout a manufacturing plant for a highly automated system.

To measure the offsets and the X direction first, the drive means 150 is activated advancing the slide 144 the programmed distance to align the probe 26 with the cutting insert 22 in the X direction. Once this has been done the drive means 140 is energized advancing the platform 130 along the X axis until the probe 26 contacts insert 22 thereby measuring and recording in the controller the offset in the X direction. The drive means 140 is then reversed retracting the platform 130 to the X axis home position. Drive means 150 is then reversed retracting the slide 144 to the Z axis home position. Drive means 140 is then re-energized advancing the platform 130 along the X axis the programmed distance wherein the probe 26 is aligned with the cutting inserts. Then the drive means 150 is energized advancing the slide 144 along the Z axis to the gauging position contacting the insert 22 thereby measuring and recording in the controller the offset in the Z direction. Drive means 150 is then the reversed retracting the slide 144 and the drive means 140 is then also reversed fully retracting the platform 130 to the X and Z axes home position, completing the measuring cycle.

In addition, the X and Z axis drive means 140 and 150 may be programed to retract the measuring device 12 only enough to clear the cutting insert 22 between measuring the offsets in the X and Z directions. The device 12 will return to the home position only after both the X and Z offsets have been measured.

While a preferred embodiment of the subject invention has been described and illustrated, it is obvious that various changes and modifications can be made therein without departing from the spirit of the present invention which should be limited only by the scope of appended claims.

What is claimed is:

1. A device for pre-gauging cutting tools to ascertain their offsets in two directions relative to a master cutting tool comprising:
   means for releasably holding a cutting tool to be gauged;
   sensing means for determining whether a cutting tool is present, clamped, or unclamped in the cutting tool clamping means;
   means for reading an identification code on the cutting tool while the tool is in the cutting tool clamping means;
   electronic gauging means movable to the gauging position for measuring the offsets between the master tool and the cutting tool;
   means for advancing and retracting the electronic gauging means from a first home position to a gauging position along a first axis; and
   means for advancing and retracting said electronic gauging means from a second home position to a gauging position along a second axis perpendicular to the first axis.

2. The device of claim 1 further including a sensing mechanism for measuring the distance of travel of the electronic gauging means along both axes.

3. The device of claim 1 wherein the releasably clamping means includes a ball detent clamp-unclamped mechanism operated by a pneumatic cylinder and rod.

4. The device of claim 3 wherein the tool clamp sensing means includes an actuator sensor attached to the cylinder rod that will align with a plurality of proximity sensors spaced axially along the cylinder rod.

5. A device for pre-gauging cutting tools to ascertain their offsets relative to a master tool, comprising:
   means for releasably clamping a cutting tool to be gauged;
   means for reading an identification code on the cutting tool while the tool is in the cutting tool clamping means; and
   electronic gauging means movable to a gauging position for measuring and providing the offsets between the master tool and the cutting tool.

6. A method for pre-gauging cutting tools with electronic gauging means to ascertain their offsets relative to a master tool, comprising:
   releasably holding a cutting tool to be gauged;
   reading a cutting tool identification code on the cutting tool while the tool is in the cutting tool gauging position;
   moving the electronic gauging means into engagement with the cutting tool in the gauging position; and
   measuring with the electronic gauging means any offsets between the master tool and the cutting tool.

* * * * *